United States Patent Office 2,997,614
Patented Aug. 22, 1961

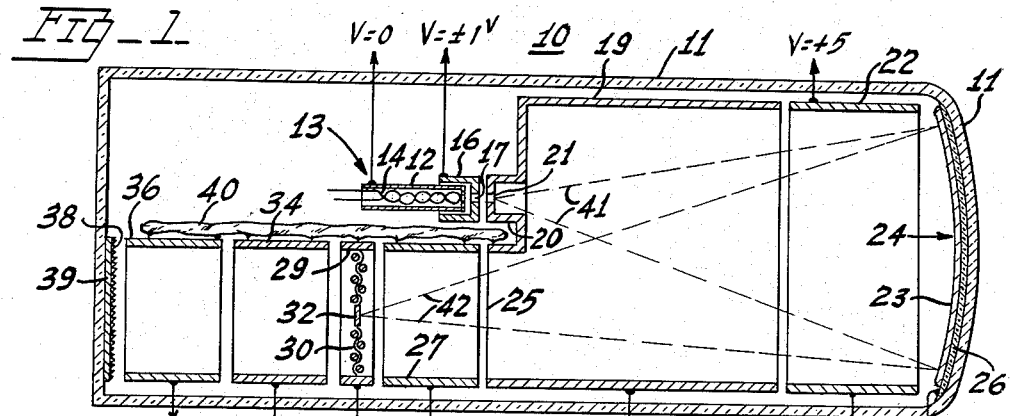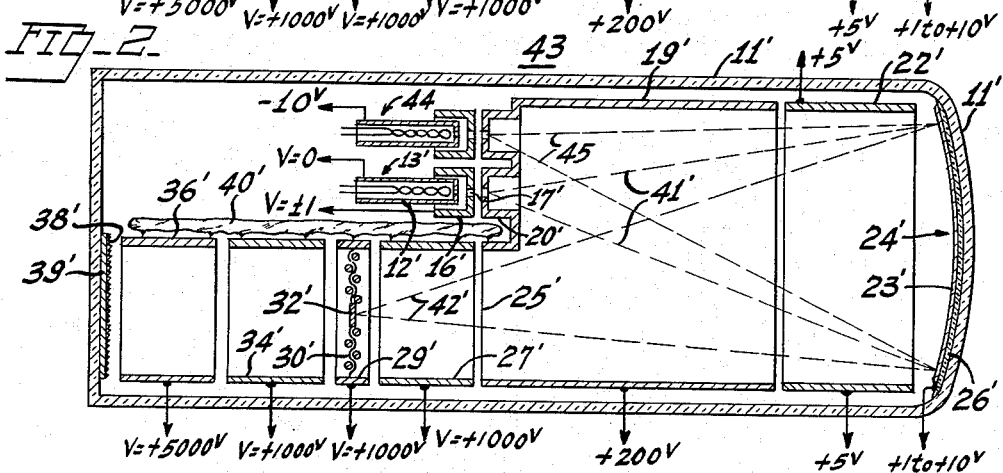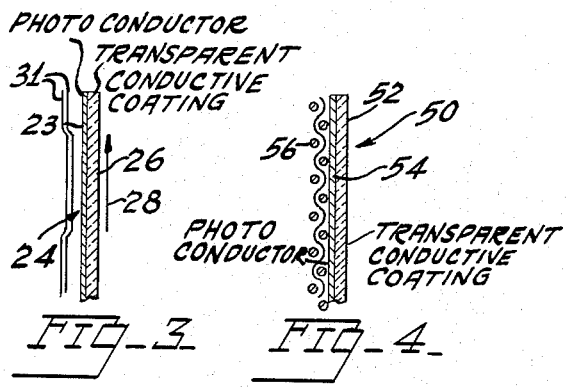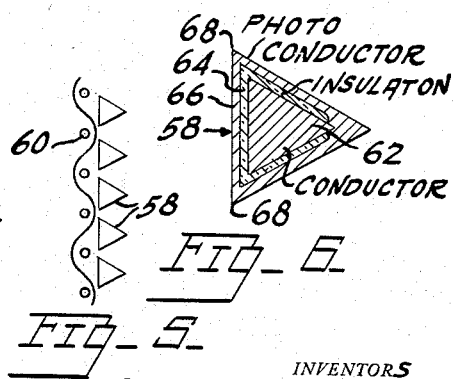

2,997,614
IMAGE TUBE
George A. Morton, Princeton, N.J., and Gardiner L. Krieger, Albuquerque, N. Mex., assignors, by mesne assignments, to the United States of America as represented by the Secretary of the Army
Filed Jan. 6, 1955, Ser. No. 480,192
12 Claims. (Cl. 313—65)

This invention relates to image devices, or tubes, for viewing objects and particularly to electronic image tubes which convert radiant energy into a visible image.

Most electronic image tubes of presently known construction utilize photo-electric target elements having films of photo-emissive material. Essentially, these devices comprise a photo-emissive target on which an image, such as an infrared image for example, is focused. Electrons emitted from the photo-emissive material form an electron image corresponding to the infrared image. The electron image is focused by magnetic or electrostatic lens fields, onto a fluorescent viewing screen which produces a visible image corresponding to, in both intensity and pattern, the electron image. When desired, an optical viewing lens located externally of the tube is provided for producing an enlarged visible image. Tubes of this general type are described in the "RCA Review," volume 7, September 1946, pages 385 to 413, and in "Electronics," September 1946, pages 112 to 114.

Image tubes of the type briefly described above are generally satisfactory when utilized in connection with infrared radiations of wave lengths up to 1 micron. However, in some applications, an image tube that is sensitive to radiations greater than 1 micron is desired.

Furthermore, for many applications, the original infrared image is very weak. In order to provide a visible image that is useful from such weak infrared images, it is necessary that the sensitivity of the image tube be extremely high.

Accordingly, it is a principal object of this invention to provide a new and improved electronic image tube.

It is another object of this invention to provide a new and novel image tube of high sensitivity and in which images are more clearly and distinctly shown.

It is a further object of this invention to provide a new and improved image tube which is sensitive to radiations covering a wide range of frequencies.

These and other objects are accomplished in accordance with this invention by providing an image tube including a special electron mirror within an envelope. Electrons from a source, real or virtual, are reflected from the mirror in such a way that they are focused into a small diameter bundle and then diverge again to fall on a fluorescent screen. A small disk intercepts the reflected electrons at the point of minimum diameter of the electron ray bundle under the reference condition, i.e., the no signal condition. Any small variations in potential along the mirror surface cause some of the reflected electrons to miss the intercepting disk and strike the fluorescent screen. When the electron bundles strike the fluorescent screen, a visible image is produced corresponding to the original image which produced the original variation in potential along the surface of the mirror.

The novel features characteristic of this invention are set forth with particularity in the appended claims. The invention itself will best be understood by referring to the following description when read in connection with the accompanying single sheet of drawings in which:

FIG. 1 is a transverse sectional view of an image tube in accordance with this invention;

FIG. 2 is a transverse sectional view of an image tube in accordance with an embodiment of this invention;

FIG. 3 is an enlarged fragmentary sectional view of an electron mirror in accordance with an embodiment of this invention;

FIG. 4 is an enlarged fragmentary sectional view of an electron mirror in accordance with an embodiment of this invention;

FIG. 5 is an enlarged fragmentary of an electron mirror in accordance with a further embodiment of this invention; and FIG. 6 is a greatly enlarged fragmentary sectional view of an element of the electron mirror shown in FIG. 5.

Referring specifically now to FIG. 1, there is shown a transverse sectional view of an image tube 10 in accordance with this invention. The tube 10 comprises an evacuated envelope 11 having a curved end wall. Within the elongated envelope 11 there is provided an electron gun 13 which includes a cathode 12 having a conventional heater 14 enclosed therein. The cathode 12 is coated with an electron emissive material, such as barium oxide. Closely spaced adjacent the end of cathode 12 is a control electrode 16, which is substantially cup-shaped, and which has an aperture 17 in the closed end thereof. The control electrode 16 is substantially in coaxial alignment with the cathode 12. The electron gun 13 is designed to provide an electron spray 41 toward the curved end wall of envelope 11.

Closely adjacent to the control electrode 16 is an accelerating electrode 19 having a substantially cup-shaped extension 20 including an aperture 21 in a closed end thereof. The aperture 21 is in coaxial alignment with the aperture 17 in control electrode 16. Accelerating electrode 19 is a tubular member and is closely spaced adjacent to the walls of the envelope 11. Closely spaced adjacent to the large open end of electrode 19 is a decelerating electrode 22. Decelerating electrode 22 is substantially the same diameter as the large open end of accelerating electrode 19 and is in substantial alignment therewith. The spacing between accelerating electrode 19 and decelerating electrode 22 may be approximately ⅛ inch. Both the accelerating electrode 19 and the decelerating electrode 22 are shown as elongated tubular metallic members, such as Nichrome or nickel cylinders. As an alternative both of the electrodes 19 and 22 may be coatings of conductive material supported on the inner walls of the envelope 11.

Closely spaced adjacent to the opposite end of decelerating electrode 22, and on the curved end wall of envelope 11, is a special electron mirror 24. The electron mirror 24 may take several forms and, in the embodiment shown in FIG. 1, is a uniform high resistance film of photoconductive material 23 laid down on a transparent conductive coating 26 formed on the inner surface of the end wall of envelope 11. The material of film 23 should be a high resistance photoconductor, i.e. a material having a resistance of the order of $10^{10}$ ohms per centimeter, such as lead sulfide, lead selenide, or lead telluride which has been processed to have a high resistance. The photoconductive material is put down with a thickness substantially within the range of 3 microns to 5 mircons depending upon the resestance desired. The transparent conductive coating 26 may be a material such as tin chloride or tin oxide.

In the opposite end of accelerating electrode 19, i.e. adjacent the gun 13, there is provided an aperture 25 which is adjacent to the extended portion 21. Closely spaced from the aperture 25 is a focusing electrode 27 comprising a tubular shaped metal electrode. Closely spaced adjacent the other open end of focusing electrode 27 is a support electrode 29 formed as a tubular electrode and supporting a mesh screen 30 across the aperture therein. The mesh screen 30 is preferably of a size having relatively large apertures so that the individual wires of the mesh screen 30 will not interfere with the passage of electrons therethrough. Supported on the mesh screen 30 is an intercepting metal disk 32, which is of a size sufficiently large to collect the reflected electrons 42.

Arranged adjacent to the grid support electrode 29 is a focusing electrode 34 formed as a tubular shaped conductive member. The focusing electrode 34 is substantially the same size as the grid support electrode 29 and is coaxially arranged therewith. Closely adjacent to the other open end of focusing electrode 34 is an accelerating electrode 36 which is also a hollow tubular shaped conductive member. Adjacent to the other end of the accelerating electrode 36 is a fluorescent screen 38. The fluorescent screen 38 may be any of the well-known types of fluorescent screens such as activated zinc sulphide, and may be supported directly on a glass end wall of envelope 11 or may be evaporated on a transparent support plate 39, as shown, mounted on the end wall of envelope 11.

The various electrodes are supported within the envelope by any of the conventional means such as glass support rods 40, only one of which is shown for simplicity of illustration. Various potentials, as those shown on the drawing of FIG. 1, may be applied to the separate electrodes. These potentials are not shown with the intent of limiting the invention but are merely given as being illustrative of an example of successful operation of the device 10.

The potentials applied to the electron gun 13 provide an electron spray 41 directed toward the mirror 24. The electron spray 41 is collimated by the electron lens between electrodes 19 and 22 as well as the electron lens between electrode 22 and mirror 24. Before the electron spray lands on the target 24 the photoconductor 23 is at the positive potential of the transparent coating 26, i.e., 1 to 10 volts positive with respect to cathode 12, due to coupling between the photoconductor 23 and the transparent coating 26. The spray 41 lands on the photoconductor 23 at low velocity and drives the surface of the photoconductor 23 to the potential of cathode 12, i.e., zero in the example shown.

Once the photoconductor 23 has been uniformly driven to the potential of cathode 12 the electrons of spray 41 are reflected. Since the photoconductor 23 is a high resistance material having a very low current leakage, most of the electrons of spray 41 are reflected. However, some of the electrons of spray 41 are continuously absorbed by mirror 24 to replace the charge lost due to the leakage through the mirror.

During the no signal condition, i.e. when the tube is in the dark, the electrons of spray 41 which are reflected by mirror 24 are directed by the positive fields determined by the curvature of mirror 24 and the adjacent accelerating electrodes 22, 19 and 27. The lens fields between electrodes 22 and 19, and 19 and 27 respectively, direct and focus the reflected electrons of spray 41 onto the electron opaque interceptor disk 32. By proper selection of the spacings, dimensions and potentials of electrodes 22, 19 and 27 as well as the curvature of mirror 24, all electrons reflected from mirror 24 will converge on disk 32, in accordance with well known electron optical principles. Thus, when no radiations from an object to be viewed are focused on photosensitive mirror 24, the reflected electrons 42 are collected by the interceptor disk 32.

Referring now to FIGURES 1 and 3 for the condition obtaining when there are radiations from an object 28 to be viewed on the mirror 24. The radiations, such as infrared radiations (for example) from object 28 produce a small change in the resistance of the photoconductor 23. This small change in the resistance of photoconductor 23 causes a slight displacement of the equipotential surfaces 31 adjacent the surface of mirror 24. The areas of mirror 24 which are not illuminated continue to reflect electrons of spray 41 onto disk 32. Also, as shown in FIGURE 3, the equipotential surfaces which are displaced by the light striking mirror 24 are not distorted and also reflect the electron spray 41 onto disk 32. However, the equipotential surfaces 31 between the illuminated and non-illuminated areas of mirror 24 distorted and include a definite variation, or "hump." Electrons 42 are reflected from a "hump" area around the interceptor disk 32 to strike the fluorescent screen 38. In other words the field pattern, established by radiations from an object 28, on mirror 24 is such that the maximum change in potential distribution occurs at the border of an illuminated area. Since only the electrons from the "hump" are deflected to pass the interceptor disk 32 the reflected electrons form a derivative image on the screen 38.

Due to the fact that the electrons which produce the scene on the fluorescent screen 38 are supplied by a thermionic cathode 12, the sensitivity of the device 10 is extremely high. In other words weak radiations from an object to be viewed are sufficient to produce a potential distribution across the surface of mirror 24 which reflects electrons in a direction to by-pass the interceptor electrode 32. The sensitivity of device 10 will be at a maximum when, with no light on mirror 24, the reflected electrons are focused at a small point, and the interceptor disk 32 is no larger than the focused electrons at this point. The focusing of electrons at a small point may be accomplished by adjusting the potentials on the various electrodes, as described above.

Referring now to FIGURE 2, there is shown an embodiment of this invention utilizing an auxiliary gun 44. The gun 44 may be similar to the gun 13 described in connection with FIGURE 1 so that further description thereof is not deemed necessary. The other electrodes of the tube 43 are also similar to those described in connection with device 10 in FIGURE 1, and each electrode is designated by a prime numeral similar to the equivalent electrode in FIGURE 1 so that further description of the electrode structure is not believed to be necessary.

The operation of device 43 is similar to that of device 10 except that the cathode of the auxiliary gun 44 is preferably maintained at a negative potential and the current of the gun 44 is adjusted, by grid 76, so that all the current from the gun 44, i.e. the electron spray 45, is absorbed by the mirror to compensate for the electron leakage through the mirror 24. As shown, the gun cathode potential is set at approximately −10 volts. The gun supplies a fixed current to the mirror 24 and is thus used to control the IR drop through the resistance of the mirror 24 by supplying a fixed current to the high resistance of the mirror 24. The use of the two guns 13 and 44, as shown in the embodiment of the invention shown in FIGURE 2, thus permits more critical adjustment of operating conditions since optimum sensitivity is more readily obtained by adjusting the gun 44 to compensate for electron leakage through mirror 24 and all of the electrons from gun 13' are reflected and may be utilized to provide useful output information. The adjustment of the potential of gun 44 may be made so that an extremely small signal from an image is sufficient to produce a "hump" in the equipotential surfaces which is sufficient to make the reflected electrons 42' miss the interceptor disk 32' and produce a visible image. It should be understood that the potentials shown in FIGURE 2 are given merely as an example of successful operation and not intended to limit the invention.

Referring now to FIGURE 4, there is shown an enlarged fragmentary sectional embodiment of an electron mirror structure in accordance with this invention. The electron mirror 50 comprises a transparent conductive coating 52 having on one surface thereof a photoconductive sheet 54. Closely spaced adjacent to the exposed surface of the photoconductor 54 is a mesh screen electrode 56 which is supported very close to, but insulated from, the photoconductor 54. The materials and thicknesses of the conductive coating 52 and the photoconductor 54 may be similar to those described above while the mesh electrode 56 may be of a material such as copper or nickel and may be a mesh of a 10 to 100 wires per inch. The number of wires per inch, of the mesh screen 56, are selected so that the electron spray lands on the mirror.

During operation of a tube similar to that described in connection with FIGURE 1, while utilizing the embodiment of the electron mirror shown in FIGURE 4, the potential of the mesh screen electrode 54 is adjusted so that it is equal to the potential of the surface of the photoconductor in darkness, i.e. the gun cathode potential. The mesh screen electrode 56 is utilized to overcome the derivative image which will be obtained in the case of the simple electron mirror shown in FIGURES 1, 2, and 3. The openings of the mesh screen 56 are selected so that the mesh 56 breaks the large surface of the photoconductor 54 into small picture elements, each of which is a small electron mirror, with the deflection from each small electron mirror being determined by the potential of the photoconductive surface immediately behind the individual openings of the mesh screen electrode 56. Due to the fact that the surface of the photoconductor comprises a large plurality of small mirrors, the electrostatic lines of force in front of the mirror will include a large plurality of "humps," rather than only the outline of the object as previously described. In other words there will be a large plurality of derivative images reproduced which will appear as a complete image on the fluorescent screen 38.

Referring now to FIGURES 5 and 6, there is shown an enlarged fragmentary view of an embodiment of a mirror structure in accordance with this invention. The photoconductor in this embodiment comprises a plurality of spaced apart triangular shaped photoconductive elements 58, shown better in FIGURE 6, which may be supported in any well-known manner. Closely spaced adjacent to one surface of the photoconductor elements 58 is a mesh screen electrode 60. The embodiment of the mirror shown in FIGURE 5 is another means for dividing the photoconductor into separate elements so that each element will reflect, as an independent mirror, a separate portion of any scene thus overcoming the problem of a derivative image. As was pointed out above, a derivative image is presented in the case of the simple mirror due to the fact that the maximum deflections from the mirror will occur at the boundaries between illuminated and unilluminated areas. The maximum deflection still occurs at the boundaries between illuminated and unilluminated areas. However, in the embodiments shown in FIGURES 5 and 6 there is provided a large plurality of these areas and therefore, the visible representation obtained by this embodiment is a complete image.

Referring now to FIGURE 6, there is shown a greatly enlarged fragmentary sectional view of the photoconductive elements shown in FIGURE 5. Each photoconductive element 58 of the electron mirror may comprise a triangular bar shaped conductor 62 which is coated on all sides, except one tip, with an insulating material 64. The triangular side, or tip, away from the gun is left free of the insulation material. Coated over the thin film of insulating material 64, and the exposed tip of conducting bar 62, is a thin film of photoconductive material 66. The cross section of each of the individual bars may be an isoceles triangle with a base, towards the electron gun, of .01" and sides of .02" or more with a layer of insulating material 64 being 1 to 3 mils in thickness and a layer of photoconductor being 3 to 10 microns in thickness.

The photoconductive material 66 utilized in the embodiment shown in FIGURE 6 need not be processed to have a high resistance. The reason for this is that both the electron beam and the radiations from an object to be viewed will strike only the edges 68 of the photoconductor. Due to the fact that the electron beam strikes only the edges of the photoconductor, the conductive path therethrough is a long path back to the tip of conductor 62 which is exposed through insulating material 64 to the photoconductor 66. Since the conductive path is long, and also since the thickness of the photoconductive material 66 may vary, the embodiment shown in FIGURE 6 permits the use of photoconductive materials having a resistance as low as $10^5$ ohms per centimeter. Examples of the low resistance photoconductors are forms of lead telluride and lead oxide.

The operation of the target shown in FIGURES 5 and 6 is substantially the same as that described in connection with FIGURE 4 with the exceptions being that the mirror is broken into small areas by the shape of the elements, and the long path through the photoconductor 66. During operation the derivative image is overcome by means of the small areas of the elements as well as by means of the mesh screen 60.

It should be understood that the electron mirror shown in FIGURES 1 through 6 could also be made of materials other than photoconductive materials. One such other material is a photovoltaic material such as lead sulphide with a Lanarkite barrier.

What is claimed is:

1. An electronic image device comprising, a plurality of electrodes including a source of electrons for providing a spray of electrons, a photosensitive electron mirror in the path of said spray of electrons, means including an electron lens and said mirror for focusing the reflected electrons at a point, means to intercept said reflected electrons at said point, said mirror including a material that changes in conductivity in response to radiations from an object to be viewed whereby the focusing of said reflected electrons is changed, and means for detecting the electrons having said change in focusing.

2. An electronic image device as in claim 1 further comprising a second source of electrons focused on said mirror for controlling the surface potential of said mirror.

3. An electronic image device as in claim 1 further comprising a multi-apertured electrode supported adjacent to but insulated from said electron mirror for varying the focus of said reflected electrons on said intercepting means.

4. An electronic image device comprising an elongated envelope, a plurality of electrodes within said envelope and including a source of electrons for providing a spray of electrons, an electron mirror in the path of said spray of electrons and in one end of said envelope, a fluorescent screen in the other end of said envelope, means including at least one electron lens and said mirror for focusing the electrons reflected from said mirror at a point within said envelope, an interceptor disk supported within said envelope and at said point, and said mirror including a material that changes in conductivity in response to radiations from an object to be viewed whereby the focusing of said reflected electrons is changed.

5. An electron image device as in claim 4 wherein said material that changes in conductivity in response to radiations from an object is a photoconductor.

6. An electron image device as in claim 4 wherein said mirror comprises a plurality of conductive elements each triangular in cross section, each of said conductive elements being enclosed except for one tip of said triangular cross section by a coating of insulating material, and each of said coatings of insulating material and the balance of each of the respective conductive elements being enclosed by a photoconductive material.

7. An electron image device as in claim 4 further comprising a second source of electrons directed onto said mirror for compensating for the electron leakage through said mirror.

8. An electron image device as in claim 4 further comprising a foraminous electrode supported closely adjacent to but insulated from said mirror.

9. An electron image device as in claim 6 further comprising a foraminous electrode supported closely adjacent to but insulated from said mirror.

10. An electron image device comprising an evacuated elongated sealed envelope, a plurality of electrodes including a source of electrons for providing a spray of electrons within said envelope, means including said plurality of electrodes for directing said spray of electrons toward one end of said envelope, an electron mirror in said one end of said envelope and in the path of said spray, means including said mirror and a plurality of electron lenses for focusing the electrons reflected from said mirror at a point within said envelope when there are no radiations on said mirror from an object to be viewed, an intercepting disk at said point, said interceptor disk being substantially the same size as the bundle of electrons focused thereat, a fluorescent screen in the other end of said envelope, and said mirror including a high resistance photoconductive material that changes in conductivity in response to radiations from an object to be viewed whereby the focusing of said reflected electrons is charged.

11. An elecronic image device as in claim 10 further comprising a second source of electrons focused on said mirror for compensating for electron leakage through said mirror.

12. An electronic image device as in claim 11 further comprising a multi-apertured electrode supported adjacent to but insulated from said electron mirror.

No references cited.

UNITED STATES PATENT OFFICE
CERTIFICATE OF CORRECTION

Patent No. 2,997,614                                 August 22, 1961

George A. Morton et al.

It is hereby certified that error appears in the above numbered patent requiring correction and that the said Letters Patent should read as corrected below.

In the grant, line 2, and in the heading to the printed specification, lines 3 and 4, for "Gardiner L. Krieger", each occurrence, read -- Gardner L. Krieger --.

Signed and sealed this 23rd day of January 1962.

(SEAL)
Attest:

ERNEST W. SWIDER                                            DAVID L. LADD
Attesting Officer                                                 Commissioner of Patents